Patented Apr. 13, 1926.

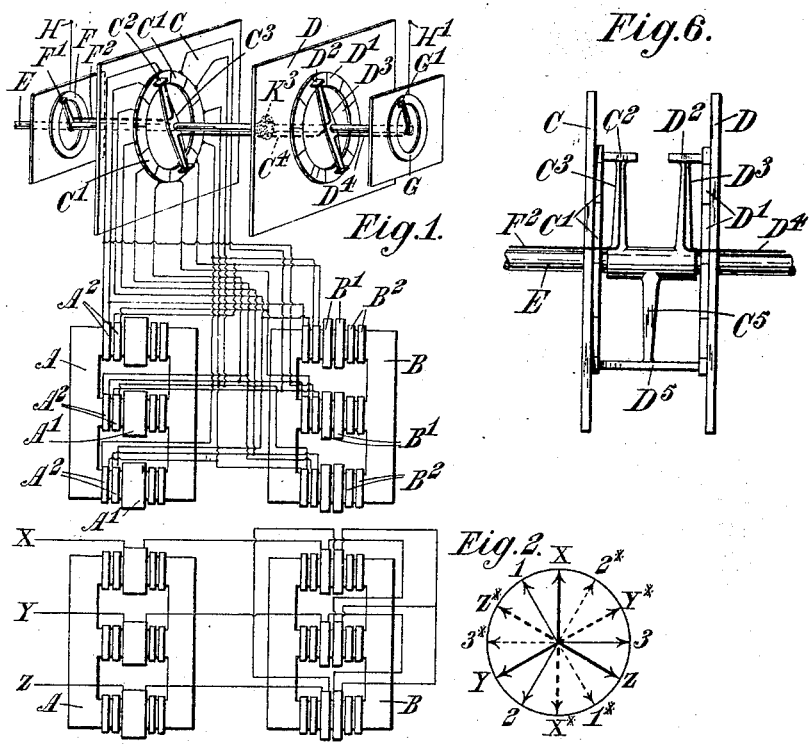

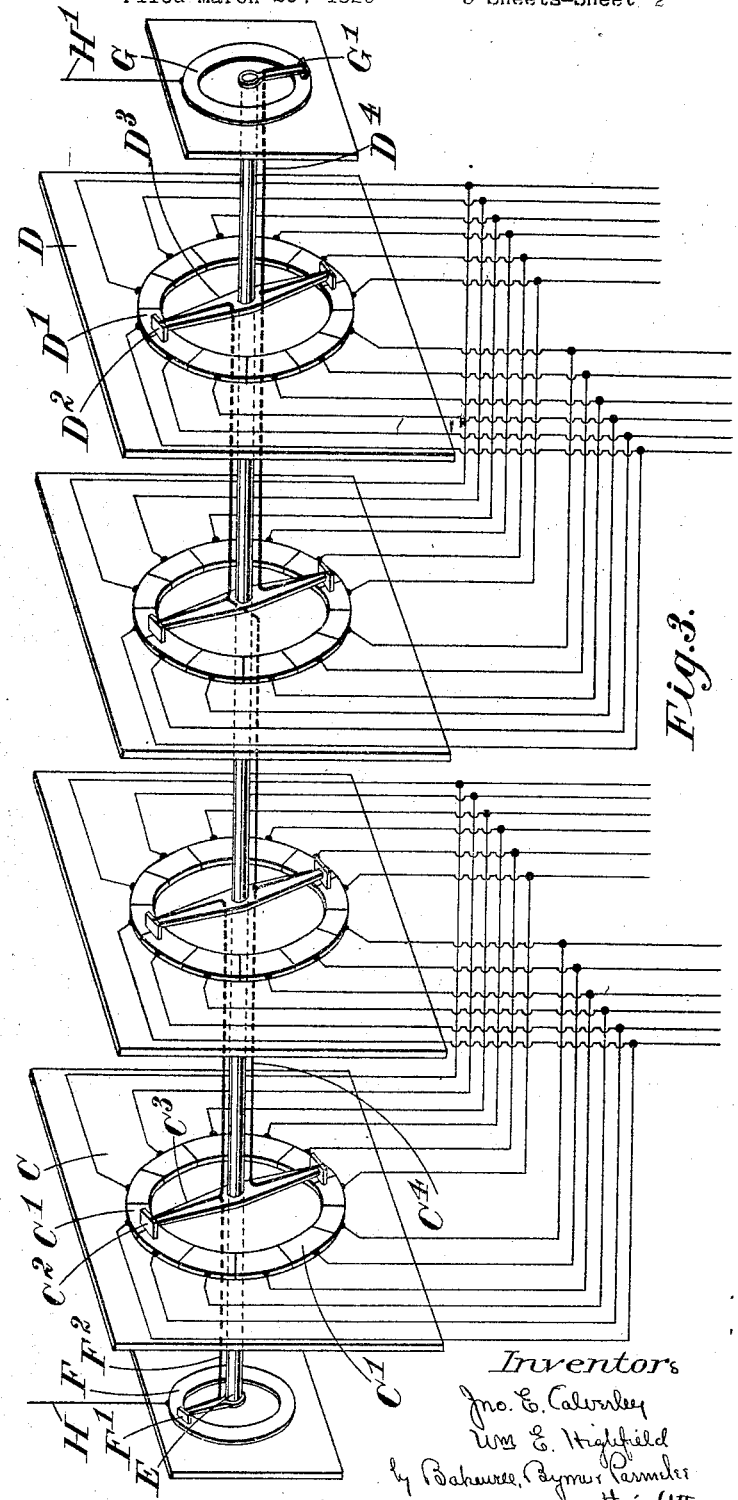

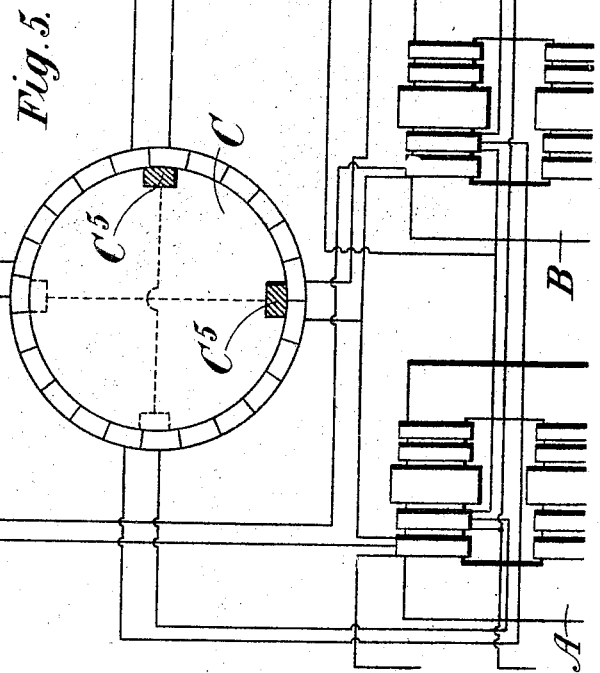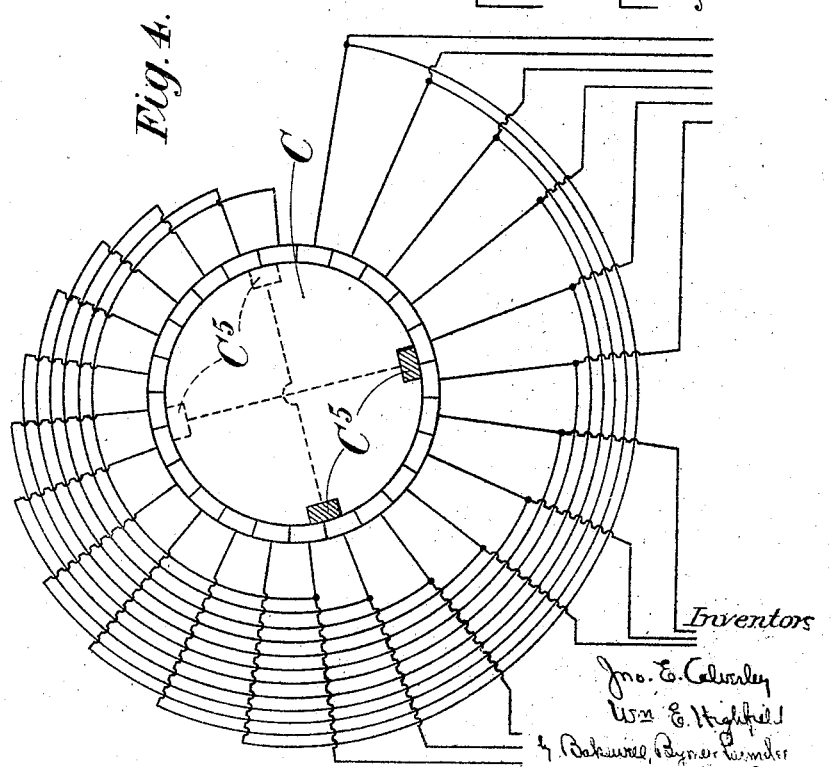

1,580,554

UNITED STATES PATENT OFFICE.

JOHN EARNSHAW CALVERLEY AND WILLIAM EDEN HIGHFIELD, OF PRESTON, ENGLAND.

APPARATUS FOR TRANSFORMING ELECTRICAL ENERGY.

Application filed March 26, 1920. Serial No. 369,001.

*To all whom it may concern:*

Be it known that we, JOHN EARNSHAW CALVERLEY and WILLIAM EDEN HIGHFIELD, subjects of the King of England, both residing at Preston, in Lancaster, England, have invented certain new and useful Improvements in Apparatus for Transforming Electrical Energy, of which the following is a specification.

This invention relates to apparatus for transforming alternating-current electrical energy into direct-current form and vice versa, or to transform direct-current of one voltage to direct-current of another voltage. The type of apparatus for the said purpose, and to which this invention relates, is that in which one or more transformers are employed whose one set of windings is so interconnected as to provide a closed circuit in which the total electromotive force at any moment is zero if the windings are operating as a secondary to the transformer or transformers, and the said closed circuit is connected to commutating gear in substantially the same manner as the winding of a Gramme ring armature is connected to its commutator.

The object of the present invention is to provide an improved construction of the said type of apparatus such as shall be suitable for operation with really high voltages, such for example as 100,000. To secure this, the present invention provides a construction which is more convenient to carry out and enables better insulation to be provided than has heretofore been the case with proposed apparatus of this type. The means adopted to these ends comprise the employment of a special subdivision of the closed circuit connected to the commutating gear and the employment of two or more commutators arranged electrically in series. The said closed circuit or portions thereof will hereinafter be described as "secondary" but it will be obvious that, when transformation from direct-current to alternating current is taking place, the function of this winding or its parts is that of a primary winding.

This invention is now further described by reference to the accompanying drawings in which—

Figure 1 is a diagrammatic illustration of an apparatus having two commutators in series together with the appropriate transformers, the connections to one commutator being omitted for the sake of clearness.

Figure 2 is a diagram showing the connections for the primary windings with a corresponding phase diagram therefor.

Figure 3 is a diagram similar to a portion of Figure 1 but showing a series parallel arrangement of commutators.

Figures 4 and 5 are diagrams of modified connections employed for the purpose of obtaining a lower speed than is needed for the connections of Figure 1, and Figure 6 is a side elevation of a modified arrangement of a pair of commutators.

The apparatus illustrated in Figures 1 and 2 is intended for the conversion of three-phase alternating-current to direct-current.

The apparatus comprises two three-phase transformers A and B, the windings whereof will hereinafter be described as primary and secondary respectively, without the intention, by the use of these terms, to restrict the suggested function of any coil to be that of primary or secondary. The particular function of a coil will depend upon whether the apparatus is transforming from alternating current to direct current or vice versa. The term "primary" will, however, be uniformly applied to the winding which receives or delivers alternating current as such, and the term "secondary" to the other set of windings, namely that which is connected to the commutator or commutators.

Each of the transformers is of the well-known three-leg type, and the primary coils on each leg are indicated at $A^1$ and $B^1$ respectively. The coils $A^1$ are connected, as shown in Figure 2, each entirely in one line of a three-phase supply X, Y, Z, while the coils $B^1$ are interconnected in the manner illustrated to produce fluxes in the legs of transformer B whose phase relations with reference to those in the legs of transformer A are as indicate by the vectors 1, 2 and 3 in the phase diagram of Figure 2. The secondary windings are indicated at $A^2$ and $B^2$ respectively, and it will be noted that for every primary winding there are four secondaries thus enabling secondary phases to be obtained corresponding with each of the vectors X, Y, Z, 1, 2, 3, in the phase diagram of Figure 2, and also with the corresponding vectors but of reversed direction lettered X*, Y*, Z*, 1*, 2*, 3* respectively.

In the diagram the four secondary coils on any one leg are shown two on one side of the primary and two on the other side, the two together on one side constituting a secondary section and both belonging to the same commutator and being connected directly to it only, so that the other section, on the opposite side of the primary, is distinct from it and is electrically connected directly to its own commutator alone and is in series with the first section by way of the commutators alone.

Only half the secondaries of the diagram are shown connected in the drawing, namely those that are connected to the segments $C^1$ of a commutator C. There is a second commutator D whose segments are connected to the remaining secondary coils in exactly the same way as are the segments $C^1$ to the secondary coils as shown.

Each commutator is provided with brushes shown at $C^2$, $D^2$ respectively, carried upon arms $C^3$, $D^3$ that are mounted upon a shaft E by which they are rotated. Slip rings F and G with brushes $F^1$, $G^1$ are also provided arranged co-axially with the commutators C and D, the brushes $F^1$, $G^1$ being mounted upon the shaft E to rotate with it. The brush $F^1$ is connected by a connector $F^2$ mounted upon the shaft, to one of the brushes $C^2$, the other brush $C^2$ is connected by a connector $C^4$ upon the shaft to one of the brushes $D^2$, while the other brush $D^2$ is similarly connected by a connector $D^4$ to the brush $G^1$. The slip rings and commutators are therefore all in series with one another.

It will be appreciated as obvious, that for correct operation it is not sufficient merely to have the brushes rotated at the correct speed, they must be truly synchronized so that each brush is situated at every moment at a point on its commutator corresponding electrically to the point to which the brushes have to be set in an ordinary direct-current machine. In other words, what may be described as nodal points of the distribution of electromotive force around the commutator revolve round the commutator, and each brush must at all times be coincident with one such node or at least must be in its immediate vicinity.

In order to secure this condition at all times, provision may be made to advance or retire the shaft angularly while it is running. This provision may, for example, take the form of means for varying the field strength of the synchronous motor driving the shaft, or of means for adjusting the stator of this motor angularly around the rotational axis of the shaft.

In the drawing, the brush arms $C^3$ and $D^3$ are shown parallel with one another. In some cases, however, it may be necessary to have them arranged as though one or more were angularly displaced from such a position with relation to the remainder. Any convenient means may be employed for this purpose, such for example as an adjustable coupling as indicated diagrammatically at $K^3$ in Figure 1. An alternative method for producing a similar result consists in so connecting the segments on a commutator to the coils of its closed circuit, that they are in advance angularly of those segments on another commutator that are connected to the corresponding coils of its own closed circuit.

It is to be understood that the diagram and circuits above described are given in a simple form, there being only two coils per transformer limb for each commutator, each coil of which is connected to two commutator bars. It will be obvious to any person skilled in the art that the coils can be further subdivided and connected to commutator bars intermediate between those shown in the diagram so as to obtain a suitable subdivision of the electromotive force between adjacent bars.

Obviously, a said "secondary" section may consist, wholly or in part, of windings arranged in parallel with one another for the sake of carrying or delivering increased current at a correspondingly less voltage, and any series parallel arrangement may be employed in the windings or even in the commutators.

The primary supply will be understood to be fed to the primaries from the mains X, Y, Z, whereas the connections between the secondaries and the commutators may be described as giving a two-pole, two-circuit, wave winding and the nodal points of the distribution of electromotive force around the commutator will rotate round the commutators at 3,000 revolutions per minute if the primary supply is of 50 cycles per second. The shaft E must therefore rotate at the same speed of 3,000 revolutions per minute. The direct-current output is obtained from the leads H, $H^1$.

Where it is desired for mechanical or other reasons to have a slower speed of rotation for the shaft and brush gear, the secondary windings can be interconnected with one another and their commutators to give the equivalent of multipolar D. C. windings thus obtaining other speeds which are synchronous with the frequency of the primary supply. Two ways are shown of doing this, namely that in Figure 4 where one of the commutators say the commutator C, is shown with four brushes $C^5$ spaced 90° apart, the diametrically opposite brushes being connected together. An alternative method is that indicated in Figure 5 in which the pitch of the connections to the commutator is so selected as to give the equivalent of a four-pole multipolar D. C. wave winding. Only a part of the circuits is indicated in Figure 5, the remainder being obvious to any person skilled in the art.

It is to be understood that the primary object of the present invention is to obtain such potential differences between adjacent commutator bars, and in general between the different parts of the brush gear as shall enable satisfactory operation of the class of apparatus referred to, to be attained. The construction provided by this invention is favourable to high insulation and readily applied insulation both of the windings and of the commutator gear, since the voltage in each section of the secondary winding is not only determined by the way in which it is connected, but has a readily predetermined value with relation to the adjacent windings; moreover, by earthing the core its relation to the whole of the system is also readily predetermined. Hence each part can be appropriately insulated with simplicity of construction and satisfactory operation.

Figure 3 is a diagram showing an arrangement of four commutators, two in series and two in parallel, enabling heavier currents to be dealt with satisfactorily than if two commutators in series were alone employed. Obviously any series parallel arrangement can be employed in an analogous manner.

A detail of construction provided by this invention is one in which two adjacent commutators, for example the two commutators C and D of Figure 1, are arranged, not as indicated diagrammatically in the drawing with the back of one towards the face of the other, but face to face. Brush gear located between these faces can be arranged so as to put one of said faces into connection with the other. Such an arrangement is diagrammatically illustrated in Figure 6 in which three brush-arms $C^3$, $D^3$ and $C^5$, are shown, whereof the arms $C^3$ and $D^3$ carry brushes $C^2$ and $D^2$, respectively, which are connected respectively to connectors $F^2$ and $D^4$ as described above with reference to Figure 1, whilst the arm $C^5$ carries a brush $D^5$ that connects the two commutators electrically in series with one another. In this arrangement the connections of the closed circuits to the segments $C^1$ and $D^1$ of the two commutators is the same as described above with reference to Figure 1, except that those of the commutator D will be rotated angularly through 180°, owing to the brush $D^2$ to which the connector $D^4$ is connected being displaced through 180° relatively to the position occupied by the corresponding brush in Figure 1.

The expression "disc type", as applied to commutators, will readily be understood to denote a commutator whose segments are arranged on a plane face, usually circular, in contradistinction to the more commonly employed kind with the segments on a cylindrical face.

What we claim as our invention and desire to secure by Letters Patent is:—

1. Apparatus for transforming electrical energy comprising a polyphase static transformer group, a plurality of secondary windings in each secondary phase of each transformer of said transformer group, a plurality of commutators, connecting means for the secondary windings whereby they are formed into a plurality of similar closed circuits, each serving as the seat of a balanced polyphase system of electro-motive forces and each being connected to the segments of one of the commutators, commutation gear comprising a negative brush and a positive brush on each commutator, means for producing relative motion between said brushes and commutators, said brushes on each commutator providing for the closed circuit associated therewith external connections which divide the said circuit into two paths in parallel which are always of substantially equal and constant electrical values similar to the circuits of a Gramme ring armature, and connecting means between brushes on the respective commutators whereby the commutators with their associated windings are put in series and serve for working with high tension continuous current.

2. Apparatus for transforming electrical energy comprising a plurality of transformer cores, primary windings in said cores, a plurality of pairs of similar secondary windings on each of said cores, a plurality of commutators, connecting means for the secondary windings whereby they are formed into a plurality of similar closed circuits each closed circuit including one pair of secondary windings from each of a plurality of cores and each said circuit serving as the seat of a balanced polyphase system of electro-motive forces and each being connected to the segments of one of the commutators, commutation gear comprising a negative brush and a positive brush on each commutator, means for producing relative motion between said brushes and commutators, said brushes on each commutator providing for the closed circuit associated therewith, external connections which divide the said circuit into two paths in parallel each of which always contains one of the secondary windings of each of the pairs of secondary windings included in the circuit and connecting means between brushes on the respective cores whereby the commutators with their associated windings are put in series and serve for working with high tension continuous current.

3. In apparatus for transforming electrical energy, static transforming means having two sets of windings with each set connected to constitute a closed circuit wherein the total electromotive force at any moment is zero when the same is operating as a secondary, two stationary commutators arranged co-axially one with the other with their operative faces turned one towards the other, means connecting each closed circuit to one of said commutators whereby successive electrically equidistant points in each closed circuit are connected to successive segments of the allotted commutator, and means comprising rotatable brushes connecting said commutators electrically in series one with the other through said brushes.

4. In apparatus for transforming electrical energy, static transforming means having a secondary winding that is sub-divided into two sections of which the magnetic conditions are identical with one another and each section connected to constitute a closed circuit wherein the total electromotive force at any moment is zero when the same functions as a secondary, two stationary commutators, spaced leads connecting each section of said winding to the segments of only one commutator, and means comprising rotatable brushes connecting said commutators electrically in series one with the other through said brushes, each closed circuit being connected to its commutator to give the electrical equivalent, as regards distribution of potential around the commutator, of a commutator connected to a multipolar direct-current armature.

5. In apparatus for transforming electrical energy, static transforming means provided with two sets of windings with each set connected to constitute a closed circuit wherein the total electromotive force at any moment is zero when the same is operating as a secondary, two stationary commutators of the disc type arranged co-axially one with the other, means connecting each closed circuit to the segments of one of said commutators whereby successive electrically equidistant points in each circuit are connected to successive segments of the allotted commutator, and means comprising rotatable brushes connecting said commutators electrically in series one with the other through said brushes.

6. In apparatus for transforming electrical energy, static transforming means having two sets of windings with each set connected to constitue a closed circuit wherein the total electromotive force at any moment is zero when the same is operating as a secondary, two stationary commutators of the disc type arranged co-axially one with the other with their operative faces turned one towards the other, means connecting each closed circuit to one of said commutators whereby successive electrically equidistant points in each closed circuit are connected to successive segments of the allotted commutator, and means comprising rotatable brushes connecting said commutators electrically in series one with the other through said brushes.

In testimony whereof we have signed our names to this specification.

JOHN EARNSHAW CALVERLEY.
WILLIAM EDEN HIGHFIELD.